June 5, 1923.
R. S. PERRY ET AL
1,457,793
PROCESS FOR OBTAINING SULPHUR
Filed April 6, 1920
2 Sheets-Sheet 1
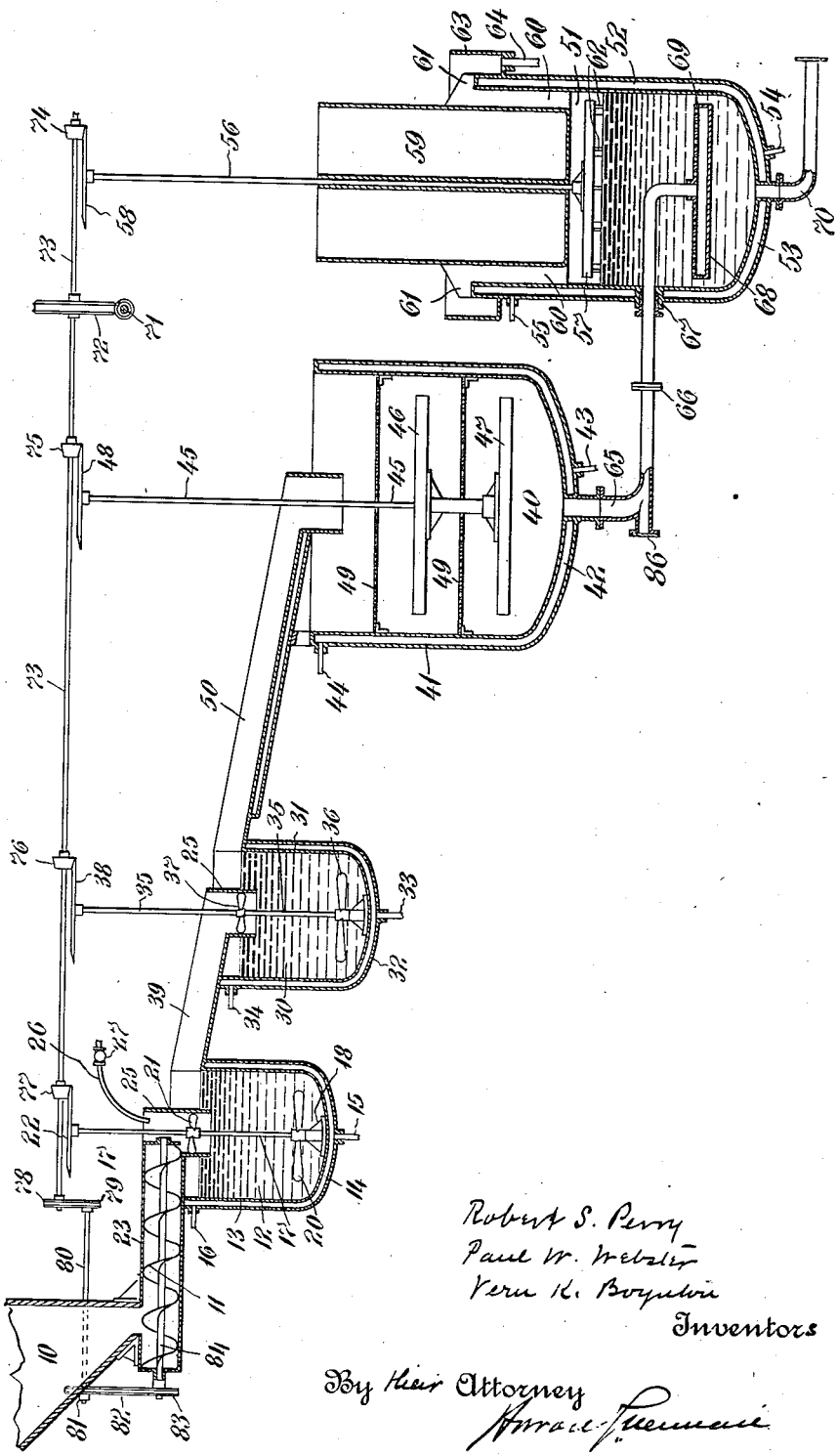

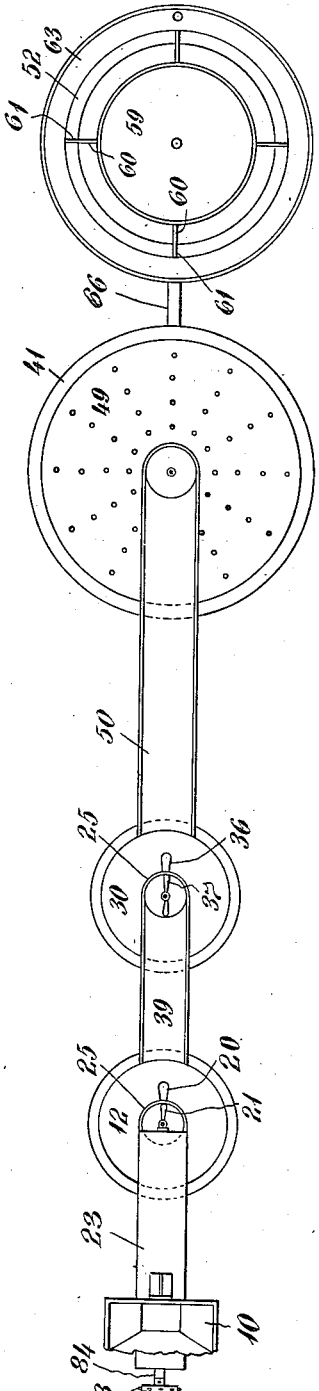

Patented June 5, 1923.

1,457,793

UNITED STATES PATENT OFFICE.

ROBERT S. PERRY, OF CAVE SPRING, GEORGIA, AND PAUL W. WEBSTER, OF PELHAM MANOR, AND VERN K. BOYNTON, OF NEW YORK, N. Y., ASSIGNORS TO PERRY & WEBSTER INCORPORATED, A CORPORATION OF NEW YORK.

PROCESS FOR OBTAINING SULPHUR.

Application filed April 6, 1920. Serial No. 371,662.

*To all whom it may concern:*

Be it known that we, ROBERT S. PERRY, PAUL W. WEBSTER, and VERN K. BOYNTON, citizens of the United States, residing, respectively, in Cave Spring, county of Floyd, and State of Georgia, Pelham Manor, county of Westchester, and State of New York, and New York city, county of New York, and State of New York, have invented certain new and useful Improvements in Processes for Obtaining Sulphur, of which the following is a full, clear, and exact specification.

Our invention relates to the separation of sulphur from sulphur-containing materials and refers particularly to a process for the separation of sulphur from sulphur-containing materials through the medium of a heated liquid.

One object of our invention is a process for the removal of sulphur from sulphur-containing materials by means of a heated liquid.

Another object of our invention is a process for the separation of gangue and solid materials from sulphur by means of a moving liquid.

Another object of our invention is a process whereby sulphur may be obtained in a practically uncontaminated condition from finely ground sulphur-containing materials.

Another object of our invention is a continuous process for the recovery of practically pure sulphur from finely ground sulphur-containing materials and the continuous separation of the spent material from the recovered sulphur.

Another object of our invention is a process whereby sulphur-containing materials may be continuously separated into sulphur and gangue.

Another object of our invention is a process whereby sulphur may be removed from a sulphur-containing material by means of a heated liquid and the spent material and liquid separated from the sulphur by a movement of the liquid.

The above and other objects of our invention will be evident upon a consideration of our specification and drawings.

Sulphur occurs in nature chiefly in the form of large deposits, usually at considerable depths below the surface, or in a co-mingled condition with rocks and ores, which may be surface deposits or may be situated below the surface.

While the recovery of sulphur from ores comprising large deep deposits can be accomplished with comparative ease, its recovery from ores in which it is co-mingled with friable materials at or near the earth's surface presents great difficulties.

Numerous methods have been proposed for the recovery of sulphur from ores but, on account of the difficulty of removing it from the interior of particles of ore and the contamination of the sulphur with fine particles of ore when the latter is ground, or disintegrates during the process, the proposed methods possess great difficulties of operation as they result either in only partial extraction of the sulphur, or the necessity of its further purification in order to obtain it in the state of purity demanded by the customers.

Further, many of the proposed methods require large quantities of steam and as the sulphur-ore deposits are frequently situated great distances from the sources of suitable fuel supplies, such processes are commercially inoperative on account of the expense necessary for shipment of ore to place of fuel supply or for shipment of fuel to ore deposits. The same difficulties present themselves in those methods in which large quantities of water are necessary for the production of steam, power, or for treating or washing purposes.

The process of our invention overcomes all of these difficulties and presents a method whereby practically pure sulphur may be obtained from sulphur-containing materials without the use of large quantities of fuel and water, which is applicable to fine materials of large and small sulphur content, and to materials which disintegrate and crumble during the operations and by its following it is possible to recover all, or nearly all, of the extractive liquids, thus causing a very considerable saving in the operation of sulphur removal and recovery.

Our process, therefore, is an economical, easily controlled and commercial method for the extraction or removal of practically pure sulphur from sulphur-containing materials and possesses new and valuable features not found in previously proposed methods.

In a broad way, the process of our invention comprises a method whereby sulphur may be extracted from sulphur-containing materials by means of an extractive liquid and the spent material and liquid removed from the sulphur by a movement of the extractive liquid, the sulphur being in a practically pure condition.

By "sulphur-containing materials" we mean those materials which contain or carry sulphur, or have it incorporated within them, in such a mechanical or chemical condition that it can be extracted therefrom and the spent material removed from the sulphur by the process of our invention.

By "extractive liquid" we mean a substance which is, or a mixture of substances which are, liquid at the temperature of molten sulphur and which will allow of practically complete removal of the spent sulphur-containing material from the extracted sulphur by a movement of the extractive liquid.

While the scope of our invention is not limited to any particular form of device, the details of construction of which may be widely varied to suit particular requirements, the accompanying drawings show one form of a device suitable for the carrying out of the process of our invention in which similar parts are designated by similar numerals.

Figure 1 is a vertical section of one diagrammatic form of apparatus suitable for the carrying out of the process of our invention.

Figure 2 is a top plan view of Figure 1.

The device, as shown in the drawings, comprises a bin 10 suitable for the reception of sulphur-containing materials, the lower portion of which opens into the revoluble screw feed 11, by which the material may be fed into the mixer 12. The mixer 12 comprises a receptacle formed by the annular jacketed side 13 and the jacketed bottom 14, having the jacket inlet pipe 15 and the jacket outlet pipe 16. A revoluble vertical shaft 17, supported by the base 18, carries an agitator 20, an agitator 21 and a gear wheel 22. Supported by the trough 23 surrounding the screw feed 11, is a cylindrical tube member 25, into which enters the exit of the trough 23 and the pipe 26, carrying the valve 27, which is connected to a source of liquid supply, not shown. The agitator 21 thus causes a mixture of the material fed by the screw feed 11 and the acid fed through the pipe 26 before they fall into the mixer, and the agitator 20 maintains them in constant agitation within the mixer 12.

A second mixer 30 comprises a receptacle formed by the jacketed bottom 32, having the inlet pipe 33 and the outlet pipe 34. This mixer 30 is similar in its construction to mixer 12 and contains the vertical revoluble shaft 35 carrying the agitators 36 and 37 and the gear wheel 38. A trough 39 connects the upper portion of the mixer 12 with the central upper portion of the mixer 30.

The agglomerator 40 comprises a receptacle formed by the jacketed side 41 and the jacketed bottom 42, having the inlet pipe 43 and the outlet pipe 44. Within the agglomerator 40 is a revoluble vertical shaft 45, carrying the agitators 46 and 47 and the gear wheel 48. Situated above each of the agitators 46 and 47, supported by the side 41 and extending across the interior of the agglomerator 40 is a foraminous diaphragm 49. A jacketed trough 50 connects the upper portion of the mixer 30 with the central upper portion of the agglomerator 40.

A scrubber 51 comprises a receptacle formed by the jacketed side 52 and the jacketed bottom 53 having the inlet pipe 54 and the outlet pipe 55. Within the scrubber 51 is a vertical revoluble shaft 56 carrying the agitator 57 and the gear wheel 58. Surrounding the shaft 56 is an annular drum 59 spaced from the side of the scrubber 51, carrying a series of vanes 60, 60, the upper extended portions of which 61, 61 can be used as a convenient means of supporting the drum 59 upon the side 52 of the scrubber 51. The agitator 57 has a series of downwardly extended rake-teeth 62, 62. The upper portion of the scrubber 51 carries an annular overflow trough 63, connected to the outlet pipe 64.

An outlet pipe 65 connected with the interior of agglomerator 40 is extended into the pipe 66, which passes through the stuffing box 67 of the side of the scrubber 51 and is connected within the scrubber 51 to the hollow annular member 68 having a foraminous top 69. An outlet pipe 70 connects the lower interior of the scrubber 51 with any suitable receptacle. A capped extension 86 of the pipe 66 allows of its being cleaned if necessary.

As one suitable means for revolving the various members, we show a worm gear 71, connected to a source of revoluble power, which, in turn, revolves the gear 72 and the shaft 73, the latter revolving the shafts 56, 45, 35 and 17 through the medium of the gear 74, 75, 76, 77. The extremity of the shaft 73 carries the gear 78 meshing with the gear 79 carried by the shaft 80, the latter carrying the sprocket 81 which is connected by the link belt 82 to the sprocket 83 carried by the shaft 84, which, in turn, carries the worm feed 11.

Having described the particular form of apparatus shown in the drawings, we will now describe the method of following the process of our invention, which is as follows:—

A sulphur-containing ore is ground to about 80 mesh and introduced into the bin 10, and the speed of the worm feed 11 and the valve 27 of the pipe 26 are so arranged that about one part by weight of ore is fed into the cylindrical member, or mixer, 25, to every five parts of sulphuric acid about 40° Bé. passing through the pipe 26. The acid may, if preferred, be preheated to a temperature of about 125° C. A revoluble movement is given the shaft 17 and the mixture of acid and ore are first mixed by the agitator 21 and then further mixed by the agitator 20. The temperature of the mixture of ore and acid within the mixer 12 is maintained at about 125° C. by means of a heated liquid, or steam, passing through the jacket of the mixer. The mixture of ore and sulphur then flows through the trough 39 into the mixer 30 where the heating and agitation are continued. The ore and acid are maintained in the mixers 12 and 30 for a length of time and at a temperature sufficient to extract all of the sulphur from the ore in a molten condition and the agitation is of such a character as to thoroughly mix the ingredients and transfer them from mixer 12 to mixer 30 and finally into the agglomerator 40 through the trough 50.

As experience has shown that at a temperature of about 120° C., the affinity of the molten sulphur globules for each other is somewhat enhanced, it is sometimes advisable to produce this temperature in the mixture, which can be accomplished by means of a liquid flowing through the jacket of the trough 50. A revoluble movement is now given the shaft 45 and the required temperature maintained in the agglomerator 40 by means of a heated liquid, or steam, passing through its jacket. The object of the treatment in the agglomerator 40 is to cause the minute globules of molten sulphur to agglomerate into globules of appreciable size, in order that the separation of the spent ore and acid therefrom may be readily and effectively accomplished. The foraminous diaphragms are so designed that the mixture flowing into the agglomerator 40 through the trough 50 will settle gradually and uniformly, and the diaphragms also prevent a vertical mixing of the contents but cause a uniform horizontal rotary movement which aids materially in the agglomeration of the sulphur globules.

The mixture of spent ore, acid and agglomerated sulphur passes from the agglomerator 40, through the pipes 65 and 66 and the foraminous member 68, into the scrubber 51. The object of the treatment in the scrubber 51 is to further agglomerate the sulphur globules and separate the spent ore and acid from the molten sulphur. The mixture from the agglomerator 40 passes upwardly through the foraminous top 69 of the member 68, the molten sulphur agglomerate having a tendency to settle from the spent ore and acid. The outflow through the pipe 70 is so arranged that the mass of molten sulphur will be of such a quantity as to reach the rake-arms 62, 62 of the agitator 57. It is evident that all of the mixture now passing through the member 68 will pass upwardly through the molten mass of sulphur, thus washing, or scrubbing, the spent ore and acid, and catching and maintaining all of the sulphur contained therein, or carried thereby.

In order to facilitate this upward flow of spent ore and acid, we have found it advantageous to introduce the drum 59 with its vanes 60, 60. This drum 59 materially reduces the area of the upper portion of the scrubber 51, and hence increases the rapidity of flow of liquid, thus facilitating the carrying off of the spent ore and the vanes 60, 60 preventing a horizontal movement of the liquid, but confining said movement to an upward direction, as further aid in the accomplishment of these desired results.

The spent ore and acid overflow into the annular trough 63 and thence through the pipe 64 to be separated into its elements, the sulphuric acid being recovered for continued use in the process and the ore recovered for use as a fertilizer or other suitable purposes.

It is evident that the speed of the feed of the ore and acid will control the length of time of treatment of the ore with the acid in the mixers 12 and 30 and the length of time for the agglomeration of the sulphur in the agglomerator 40. It is further evident that the agitation in the mixers 12 and 30 must be such as to cause a thorough inter-mixing of the ore, sulphur and acid to allow all of them to pass through the trough 50, and the speed of the agitation in the scrubber 51 must be such as to allow the sulphur to settle and the spent ore and acid to pass therethrough and then outwardly of the scrubber and that the pipe 70 may be so opened as to draw off the same amount of sulphur as is extracted from the ore. It is evident that these conditions may be arranged to produce a constant extraction of sulphur from the ore and the removal of the spent ore and acid therefrom.

It is further evident that we may dispense with the use of the agglomerator 40, and accomplish the result by means of the scrubber, which will thus agglomerate and separate the materials, the movement of the liquid separating the spent ore and acid from the sulphur.

While the process as described is continuous in its operation, it is evident that it may be employed in an intermittent manner and that the various steps of the operation may be used irrespective of a continuous process.

We do not limit ourselves to sulphuric acid as an extractive liquid, as it may be replaced by many other organic and inorganic substances which are adaptable to our process to produce the described and claimed results.

A consideration of the above described process will illustrate its novelty, economy and practical commercial value, especially as applied to those sulphur-containing ores and materials which disintegrate during the process of sulphur extraction with the consequent contamination of the sulphur and its adaptability of application at places where the supply of fuel or water is comparatively limited.

We do not limit ourselves to the particular chemicals, quantities, temperatures and sequence of operative steps mentioned, nor to the particular devices described and shown, all of which may be varied without going beyond the scope of our invention as described and claimed.

What we claim is:—

1. In a continuous process of separating sulphur from sulphur containing material, the step which comprises passing a mixture of an extractive liquid, spent ore and molten sulphur into an agitated fluid body thereby removing the extractive liquid and the spent ore from contact with the sulphur.

2. In a continuous process of separating sulphur from sulphur containing material, the step which comprises passing a mixture of an extractive liquid, spent ore and molten sulphur into an agitated mass of molten sulphur thereby removing the extractive liquid and the spent ore from contact with the sulphur.

3. In a continuous process of separating sulphur from sulphur containing material, the step which comprises passing a mixture of sulphuric acid, spent ore and molten sulphur into an agitated fluid body thereby removing the sulphuric acid and the spent ore from contact with the sulphur.

4. In a continuous process of separating sulphur from sulphur containing material, the step which comprises passing a mixture of sulphuric acid, spent ore and molten sulphur into an agitated mass of molten sulphur thereby removing the sulphuric acid and the spent ore from contact with the sulphur.

5. A continuous process for the separation of sulphur from a sulphur-containing material which comprises, heating at atmospheric pressure a mixture of a sulphur-containing material and an extractive liquid to a temperature of about 125° C. causing a movement of the liquid whereby the extracted sulphur will agglomerate into a molten mass and removing the material and liquid from contact with the sulphur.

6. A continuous process for the separation of sulphur from a sulphur-containing material which comprises, heating at atmospheric pressure a mixture of a sulphur-containing material and an extractive liquid to a temperature of about 125° C. until the sulphur is practically extracted from the material, cooling the mixture to about 120° C. causing a movement of the liquid whereby the extracted sulphur will agglomerate into a molten mass and removing the material and liquid from contact with the sulphur.

7. A continuous process for the separation of sulphur from a sulphur-containing material which comprises, heating a liquid having a boiling point above 100° C. with a sulphur-containing material to about 125° C., causing a movement of the mixture whereby the extracted sulphur will agglomerate, the movement of the liquid removing the material from contact with the sulphur.

8. A continuous process for the separation of sulphur from a sulphur-containing material which comprises, heating a liquid having a boiling point above 100° C. with a sulphur-containing material to about 125° C. until the sulphur is practically extracted, cooling the mixture to about 120° C., causing a movement of the mixture whereby the extracted sulphur will agglomerate, the movement of the liquid removing the spent material from contact with the sulphur.

9. A continuous process for the separation of sulphur from a sulphur-containing material which comprises, heating a mixture of a sulphur-containing material and sulphuric acid to about 125° C., maintaining the temperature until the sulphur is practically extracted and removing the spent material and the acid from the sulphur by a movement of the mixture.

10. A continuous process for the separation of sulphur from a sulphur-containing material which comprises, heating a mixture of a sulphur-containing material and sulphuric acid to about 125° C., maintaining the temperature until the sulphur is practically extracted, cooling the mixture to about 120° C., and removing the spent material and the acid from the sulphur by a movement of the mixture.

11. A continuous process for the separation of sulphur from a sulphur-containing material which comprises heating a mixture of a sulphur-containing material and sulphuric acid to about 125° C., maintaining the temperature until the sulphur is practically extracted, and removing the spent material and the acid from the sulphur by a movement of the mixture whereby the sulphur will be agglomerated and caused to settle.

12. In a process for the separation of sulphur from a sulphur-containing material, the step which comprises passing at atmospheric pressure a mixture of spent material and a liquid into a bath of molten sulphur whereby the spent material and liquid will pass therethrough accumulating sulphur of the mixture in the molten mass.

13. In a process for the separation of sulphur from a sulphur-containing material, the step which comprises passing at atmospheric pressure a mixture of spent material and sulphuric acid into a bath of molten sulphur whereby the spent material and liquid will pass therethrough accumulating sulphur of the mixture in the molten mass.

14. The process of separating sulphur from a sulphur-containing material which comprises, immersing the material at atmospheric pressure in a liquid capable of being heated to the melting point of sulphur, maintaining the temperature at approximately the melting point of sulphur until the sulphur is practically extracted from the material, causing an agglomeration of the molten sulphur globules and passing the spent material and the liquid into a bath of molten sulphur whereby the spent material and liquid will pass therethrough accumulating sulphur of the mixture in the molten mass.

15. The process of separating sulphur from a sulphur-containing material which comprises, immersing the material at atmospheric pressure in a liquid capable of being heated to the melting point of sulphur, maintaining the temperature at approximately the melting point of sulphur until the sulphur is practically extracted from the material, causing an agglomeration of the molten sulphur globules by a movement of the mixture and separating the spent ore and liquid from the sulphur by passing them into a bath of molten sulphur whereby the spent material and liquid will pass therethrough accumulating sulphur of the mixture in the molten mass.

16. The process of separating sulphur from a sulphur-containing material which comprises, heating at atmospheric pressure a mixture of sulphur-containing material and sulphuric acid to the temperature of molten sulphur, maintaining the temperature at approximately the melting point of sulphur until the sulphur is practically extracted from the material, causing an agglomeration of the molten sulphur globules and passing the spent material and the acid into a bath of molten sulphur whereby the spent material and liquid will pass therethrough accumulating sulphur of the mixture in the molten mass.

17. The process of separating sulphur from a sulphur-containing material which comprises, heating at atmospheric pressure a mixture of sulphur-containing material and sulphuric acid to the temperature of molten sulphur, maintaining the temperature at approximately the melting point of sulphur until the sulphur is practically extracted from the material, causing an agglomeration of the molten sulphur globules by a movement of the mixture and separating the spent ore and acid from the sulphur by passing them into a bath of molten sulphur whereby the spent material and liquid will pass therethrough accumulating sulphur of the mixture in the molten mass.

Signed at New York in the county of New York and State of New York this 28 day of February, 1920.

ROBERT S. PERRY.
PAUL W. WEBSTER.
VERN K. BOYNTON.